UNITED STATES PATENT OFFICE.

AMOS H. GILLETTE, OF ATLANTIC CITY, NEW JERSEY, ASSIGNOR TO FRANK M. SIMONS AND WILLIAM J. SIMONS, BOTH OF ATLANTIC CITY, NEW JERSEY.

COMBINATION VEHICLE-TOP.

1,269,073.      Specification of Letters Patent.      Patented June 11, 1918.

Original application filed March 3, 1917, Serial No. 152,164. Divided and this application filed September 6, 1917. Serial No. 189,939.

*To all whom it may concern:*

Be it known that I, AMOS H. GILLETTE, a citizen of the United States, residing at Atlantic City, in the county of Atlantic and State of New Jersey, have invented new and useful Improvements in Combination Vehicle-Tops, of which the following is a specification.

My invention relates to new and useful improvements in a combination vehicle top and the same being a division from my application for Letters Patent, filed March 3, 1917 and bearing Serial Number 152,164 and has for its object to provide a device of this character which may be adjusted to form either a victoria top or touring top.

A further object of the invention is to provide a combination vehicle top in which a collapsible touring frame is hinged to a collapsible victoria frame so that the latter may be used independently or the former used in combination with the latter to produce a touring top extending over the entire seating capacity of the vehicle to which it is attached.

A still further object of the invention is to provide a vehicle top comprising a victoria frame having a touring or extension frame hinged thereto for separating a cover in two different open positions, said touring frame being made up of hinge members so that it may be collapsed and the parts thereof moved into parallelism with some part of the victoria frame so that the touring frame will be out of the line of vision of the occupants of the vehicle and out of the way of persons entering and leaving the vehicle.

With these ends in view my invention consists in the details of construction and combination of elements hereinafter set forth and then specifically designated by the claims.

In order that those skilled in the art to which this invention appertains may understand how to make and use the same, I will describe its construction in detail referring by numerals to the accompanying drawings forming a part of this application in which:—

Figure 1:
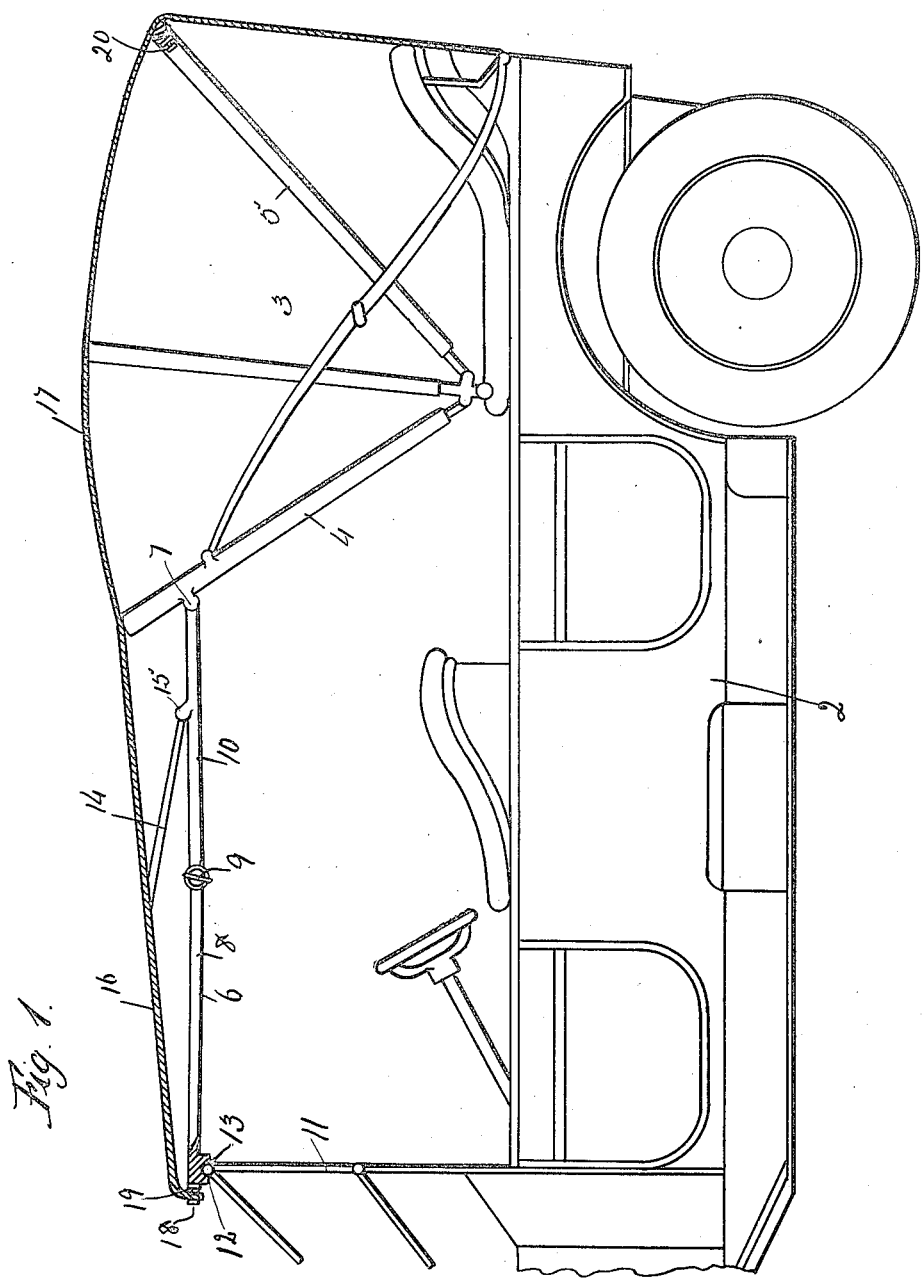
Figure 1, is a fragmentary side elevation of an automobile showing my improved combination vehicle top applied thereto and extending to produce the style known as a touring top, portions thereof being shown in section to clearly illustrate the invention.

In carrying out my invention as here embodied 2 represents a vehicle here shown as an automobile and to this is attached in any suitable manner the victoria top frame 3 of any desirable construction and formation and which is held or supported in an open position by any suitable means.

As I do not wish to be limited to the particular construction of the different parts making up the vehicle top frame, I will refrain from describing its construction in detail with the exception that it includes a forward and rear bow 4 and 5 respectively.

To some suitable portion of the arms of the front bow 4 are hinged the inner ends of the touring top frame 6 as at 7, located at or near the upper or outer ends of the arms of the forward bow.

The touring frame 6 is made up of a reach bow 8 hinged as at 9 and the side bars 10 which latter are the portions of the touring frame having hinged connections with the victoria frame, and these hinges may be locked in any suitable manner not shown or described as the specific construction does not enter into my invention, or in other words the different parts may be held in their adjusted positions in any suitable and well known manner.

When the touring frame is in its open position as shown in Fig. 1 the outer end thereof is supported by a frame 11 such as the wind shield or any other suitable frame which might consist of two rods suitably attached to the vehicle. One manner in which this touring frame may be fastened to the supporting frame 11 is here shown and consists of a ball 12 on said frame which is adapted to register with a socket 13 carried by the front portion of the reach bow 8 and these are held in registration in any suitable manner as by the ordinary retaining straps (not shown).

To the side bars or members 10 is hinged a suitable supporting bow 14 as at 15 and this supporting bow forms a part of the touring frame and is adapted to support the cover extension 16 intermediate its length and said cover extension forms a part of the main cover 17 which is secured to the victoria frame.

Figure 2:
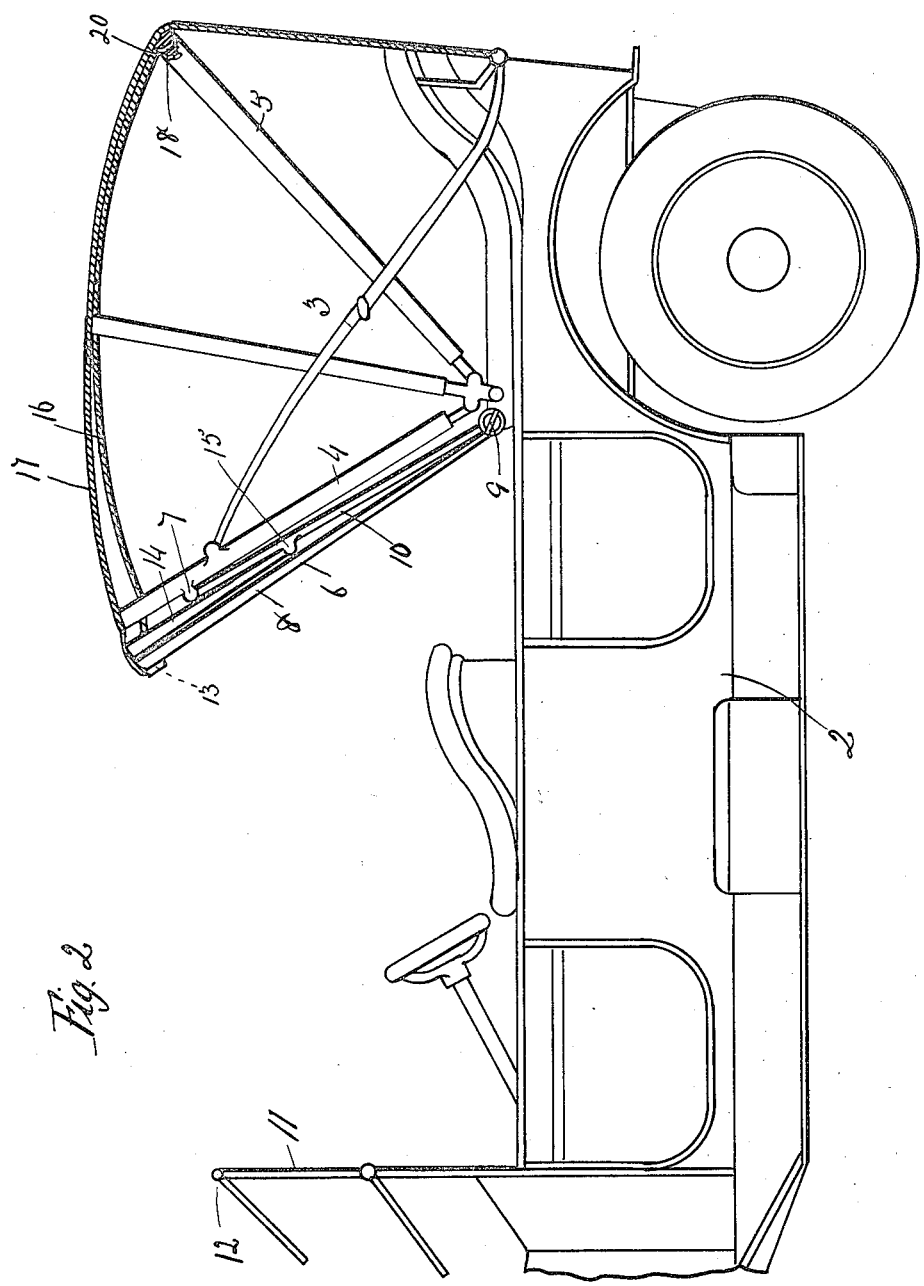
Fig. 2, is a similar view showing my top folded to form the victoria style.

The front end of the cover extension 16 is provided with suitable fastening devices 18 which when the cover extension is in its open position it engages suitable complementary devices 19 carried by the cross bar of the reach bow 8 or when the extension cover is folded under the main cover so as to produce the vehicle as shown in Fig. 2, the fastening devices 18 carried by the cover extension engage suitable complementary devices 20, identically constructed to the ones designated by the numeral 19 but carried by some suitable portion of the victoria frame such as the rear bow 5 thereof.

When the touring top frame is adjusted to its raised or open position to form the touring top as shown in Fig. 1, the parts are located or fastened in their adjusted positions and the cover extension 16 is attached to the edge of the touring top frame and when it is desired to use the top in the victoria style the cover extension 16 is first detached from the touring top frame and said touring top frame is then folded up or collapsed until the side bars 10 lie parallel with the side arms of the forward bow 4 of the touring frame and the side arms of the reach bow 8 lie parallel with the side bars 10 with the cross rod of the reach bow adjacent the cross bar of the forward bow 4, and at the same time the supporting bow 14 is folded upward until it approximately alines with the parts of the forward bow 4 of the victoria frame. After the touring frame has been folded as above described, the cover extension 16 is folded back beneath the reach bow 8 and the supporting bow 14 and that part which was its forward or outer end is fastened to the rear bow 5 of the victoria frame by means of the fastening devices 18 and the complementary fastening devices 20 as plainly shown in Fig. 2.

Of course I do not wish to be limited to the exact details of construction as herein shown as these may be varied within the appending claims without departing from the spirit of my invention.

Having fully described my invention what I claim as new and patentable is:—

1. A vehicle top comprising a victoria frame, a touring frame hinged thereto and adapted to extend from the forward portion of or folded up in parallelism with said forward portion of said victoria frame, said touring frame consisting of side bars, a reach bow hinged to the outer end thereof and a supporting bow hinged to the side bars intermediate their length, a cover attached to the victoria frame, an extension of said cover adapted to cover the touring frame or be folded under the main cover, fastening devices carried by the reach bow and the victoria frame whereby said extension may be held in an open or closed position.

2. A vehicle top comprising in combination a victoria frame including a front bow and rear bow, fastening means carried by the rear bow, side bars hinged to the forward bow adjacent the top thereof, a reach bow hinged to said side bars, said side bars and reach bow forming a touring top frame, said reach bow adapted to coincide with the forward bow of the victoria frame when the touring top frame is collapsed, fastening means carried by the reach bow and a cover attached to the victoria frame and provided with an extension, complementary fastening means carried by the forward end of the extension whereby said extension may be detachably secured to the touring top frame when the same is in a raised position and whereby said extension may be folded under the reach bow and the forward bow of the victoria frame and detachably secured to the rear bow of the victoria frame when the touring top frame is collapsed.

In testimony whereof, I have hereunto affixed my signature.

AMOS H. GILLETTE.